US012469980B2

(12) United States Patent
Oh et al.

(10) Patent No.: US 12,469,980 B2
(45) Date of Patent: Nov. 11, 2025

(54) LIQUID CRYSTAL POLARIZATION ANTENNA

(71) Applicant: SEOUL NATIONAL UNIVERSITY R&DB FOUNDATION, Seoul (KR)

(72) Inventors: Jungsuek Oh, Seoul (KR); Byeongju Moon, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 173 days.

(21) Appl. No.: 18/354,154

(22) Filed: Jul. 18, 2023

(65) Prior Publication Data

US 2024/0030618 A1 Jan. 25, 2024

(30) Foreign Application Priority Data

Jul. 19, 2022 (KR) ........................ 10-2022-0088955
May 16, 2023 (KR) ........................ 10-2023-0063274

(51) Int. Cl.

*H01Q 15/24* (2006.01)
*H01Q 1/38* (2006.01)
*H01Q 1/50* (2006.01)
*H01Q 3/38* (2006.01)

(52) U.S. Cl.

CPC ............. *H01Q 15/242* (2013.01); *H01Q 1/38* (2013.01); *H01Q 1/50* (2013.01); *H01Q 3/38* (2013.01)

(58) Field of Classification Search

CPC .......... H01Q 15/242; H01Q 1/38; H01Q 1/50; H01Q 3/38; H01Q 3/44
See application file for complete search history.

(56) References Cited

U.S. PATENT DOCUMENTS 6,552,696 B1 * 4/2003 Sievenpiper ............. H01Q 3/44
343/754
8,040,586 B2 10/2011 Smith et al.
2020/0194899 A1 * 6/2020 Lu ........................ H01Q 15/244
2020/0272023 A1 8/2020 Won et al.
2022/0013903 A1 * 1/2022 Evans ..................... H01P 3/006
2022/0037785 A1 2/2022 Okita
2022/0102863 A1 * 3/2022 Shekhar ............... H01Q 9/0485

FOREIGN PATENT DOCUMENTS

JP 2022-025914 A 2/2022
KR 10-2020-0025723 A 3/2020
(Continued)

OTHER PUBLICATIONS

Yunping Qi et al., "Ultra-Broadband Polarization Conversion Meta-Surface and Its Application in Polarization Converter and RCS Reduction", IEEE Access, Jun. 22, 2020, pp. 116675-116684, vol. 8.

(Continued)

*Primary Examiner* — Dameon E Levi
*Assistant Examiner* — Yonchan J Kim
(74) *Attorney, Agent, or Firm* — Sughrue Mion, PLLC

(57) ABSTRACT

Provided is a liquid crystal polarization antenna including a plurality of unit cells arranged two-dimensionally in a first direction and a second direction perpendicular to the first direction, and a conductive line configured to electrically connect to each other the unit cells arranged in the first direction of the plurality of unit cells.

17 Claims, 13 Drawing Sheets

(56) References Cited

FOREIGN PATENT DOCUMENTS

| | | | |
|---|---|---|---|
| KR | 10-2020-0103440 | A | 9/2020 |
| KR | 10-2374151 | B1 | 3/2022 |

OTHER PUBLICATIONS

Yongtao Jia et al., "A Dual-Patch Polarization Rotation Reflective Surface and Its Application to Ultra-Wideband RCS Reduction", IEEE Transactions on Antennas and Propagation, Jun. 2017, pp. 2391-3295, vol. 65, No. 6.

Wenting Li et al., "Polarization-Reconfigurable Circularly Polarized Planar Antenna Using Switchable Polarizer", IEEE Transactions on Antennas and Propagation, Sep. 2017, pp. 4470-4477, vol. 65, No. 9.

Wenfei Hu et al., "Design and Measurement of Reconfigurable Millimeter Wave Reflectarray Cells With Nematic Liquid Crystal", IEEE Transactions on Antennas and Propagation, Oct. 2008, pp. 3112-3117, vol. 56, No. 10.

Chun Ni et al., "Design of Frequency-and Polarization-Reconfigurable Antenna Based on the Polarization Conversion Metasurface", IEEE Antennas and Wireless Propagation Letters, Jan. 2018, pp. 78-81, vol. 17, No. 1.

* cited by examiner

LIQUID CRYSTAL POLARIZATION ANTENNA

CROSS-REFERENCE TO RELATED APPLICATIONS

This application is based on and claims priority under 35 U.S.C. § 119 to Korean Patent Application No. 10-2022-0088955, filed on Jul. 19, 2022, and Korean Patent Application No. 10-2023-0063274, filed on May 16, 2023, in the Korean Intellectual Property Office, the disclosures of which are incorporated by reference herein in their entirety.

BACKGROUND

1. Field

The disclosure relates to antennas, and more particularly, to liquid crystal polarization antennas.

This research was supported by the Samsung Future Technology Fostering Program (Project No. SRFC-TE2103-01).

2. Description of the Related Art

Recent advances in communications technology have led to use of higher frequencies. Currently, the most advanced commercial technology, 5G, uses the 28 GHz band, and the next generation, 6G, will use the Sub THz band above 100 GHz. Due to the increase in used frequencies, increased power consumption and losses in the feed network affect the antenna design.

With higher frequencies, reflective array antennas are emerging as a viable candidate. Reflective array antennas are less expensive to fabricate than phased array antennas, and utilize free-space feeding that eliminates the need for complex feeding structures, thereby making them very practical at higher frequencies.

Various devices and materials have been researched for beam steering in reflective array antennas.

SUMMARY

Provided is a liquid crystal polarization antenna with low return loss.

Provided is a liquid crystal polarization antenna capable of converting the polarization of an incident wave.

Additional aspects will be set forth in part in the description which follows and, in part, will be apparent from the description, or may be learned by practice of the presented embodiments of the disclosure.

According to an aspect of the disclosure, a liquid crystal polarization antenna includes a plurality of unit cells two-dimensionally arranged in a first direction and a second direction perpendicular to the first direction, and conductive lines configured to electrically connect unit cells arranged in the first direction of the plurality of unit cells, wherein each of the plurality of unit cells includes a first electrode, a liquid crystal layer disposed on the first electrode, and a second electrode disposed on the liquid crystal layer and including a first conductive ring that has a first gap and a second conductive ring that has a second gap.

The second electrode may be symmetrically shaped with respect to the first direction and asymmetrically shaped with respect to the second direction.

In addition, the second conductive ring may be spaced apart from the first conductive ring while surrounding the first conductive ring.

In addition, a distance between the first conductive ring and the second conductive ring may be less than or equal to a width of at least one of the first conductive ring and the second conductive ring.

In addition, the first gap and the second gap may be arranged in the first direction.

In addition, at least a portion of the first gap may be arranged to overlap the second gap in the first direction.

In addition, a width of the first gap may be less than a quarter of a length of the first conductive ring.

In addition, a distance between the first gap and the second gap may be greater than or equal to a distance between the first conductive line and the second conductive line.

In addition, the width of the first gap may be greater than or equal to a width of the first conductive ring.

And, the width of the first gap may change from an inner side of the first conductive ring to an external side of the first conductive ring.

In addition, the first conductive ring may be part of any one of a circular ring, an elliptical ring, and a polygonal ring.

And, a width of the conductive line may be less than the width of the first conductive ring and the width of the second conductive ring.

In addition, the conductive line may include a first conductive line configured to electrically connect the first conductive ring and the second conductive ring that are included in a same unit cell of the plurality of unit cells.

And, the first conductive line may extend in the first direction.

In addition, the conductive line may further include a second conductive line configured to electrically connect the first conductive ring and the second conductive ring included in different unit cells of the plurality of unit cells.

And, the second conductive line may pass through the first gap and the second gap.

In addition, the plurality of unit cells may include a first unit cell and a second unit cell spaced apart in the first direction, and a third unit cell and a fourth unit cell spaced apart in the second direction, wherein a portion of the third unit cell may be arranged to overlap on the first unit cell and the second unit cell in the first direction.

And, The liquid crystal polarization antenna may rotationally convert the polarization of the incident wave by +90 or −90 degrees relative to the direction of travel of the wave.

In addition, the liquid crystal polarization antenna may steer waves with an absolute value of return loss of 10 dB or less over a frequency bandwidth of 5 GHz or more.

And, the liquid crystal polarization antenna may have a variable phase range of 100 degrees or more.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
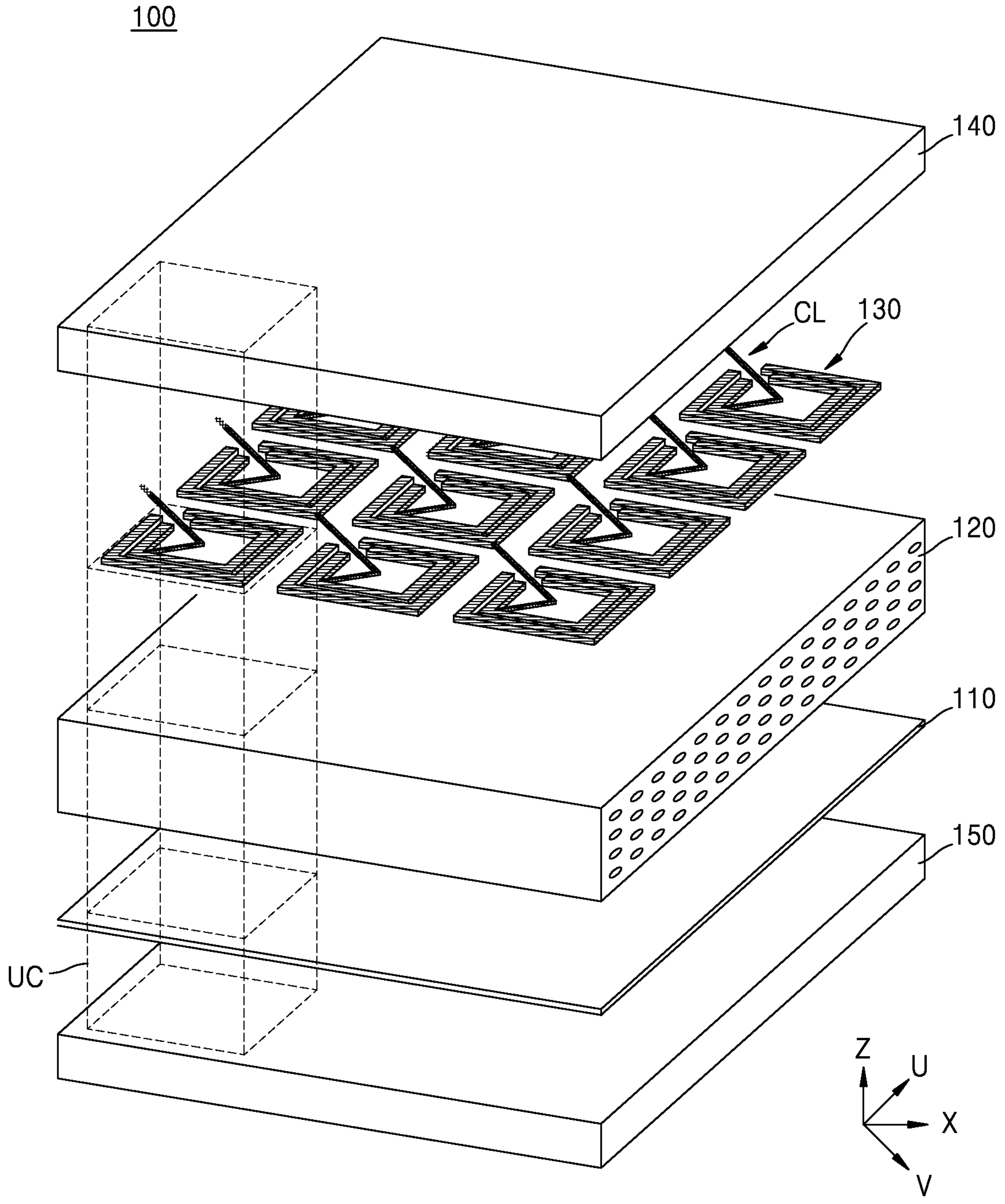
FIG. 1 is an exploded view diagram illustrating a liquid crystal polarization antenna according to a first embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments may be described in more detail with reference to the accompanying diagrams. In the following diagrams, same reference numerals refer to same components, and the size of each component in the diagrams may be exaggerated for clarity and convenience of explanation. Meanwhile, the embodiments described herein are merely exemplary, and various modifications of these embodiments are possible.

Hereinafter, references to "above" or "on" may include those directly above, below, to the left, or to the right in contact as well as those above, below, to the left, or to the right in non-contact. A singular expression may include a plural expression unless the context clearly indicates otherwise. When a portion is said to "include" a component, it is intended to mean that it may further include other components, not exclude other components, unless specifically stated to the contrary.

The use of the term "comprising" and similar indicative terms may refer to both the singular and plural. In the absence of an explicit ordering of the steps including a method, or anything to the contrary, the steps may be performed in any reasonable order and are not necessarily limited to the order described.

Terms such as ". . . unit," "module," etc. in the specification refer to a unit that performs at least one function or operation, which may be implemented in hardware or software, or a combination of hardware and software.

The line connections or lack of connections between components shown in the diagrams are exemplary representations of functional connections and/or physical or circuit connections, which may be represented by various alternative or additional functional connections, physical connections, or circuit connections in the actual apparatus.

An expression such as "at least one" preceding a list of elements qualifies the entire list of elements and does not qualify any individual elements of the list. For example, expressions such as "at least one of A, B, and C" or "at least one selected from the group consisting of A, B, and C" may be interpreted as A only, B only, C only, or any combination of two or more of A, B, and C, such as ABC, AB, BC, and AC.

Where "about" or "substantially" is used in connection with a numerical value, the figure involved may be construed to include fabricating or operating deviations (for example, ±10%) around the stated numerical value. When the terms "normally" and "substantially" are used with respect to a geometric shape, it may be intended that no geometric precision is required and that tolerances for the shape are within the scope of the disclosure. Regardless of whether a numerical value or shape is qualified as "about" or "substantially," such values and shapes may be interpreted to include fabricating or operational deviations (for example, ±10%) around the stated numerical value.

Terms such as first, second, etc. may be used to describe various components, but the components may not be limited by the terms. The terms may be used only to distinguish one component from another.

The use of any examples or exemplary terms is merely to illustrate technical ideas in detail and is not intended to limit the scope of the claims unless such examples or exemplary terms are limited by the claims.

Referring to the accompanying diagrams, detailed descriptions can be made based on an embodiment for the purpose of illustration only.

Figure 2:
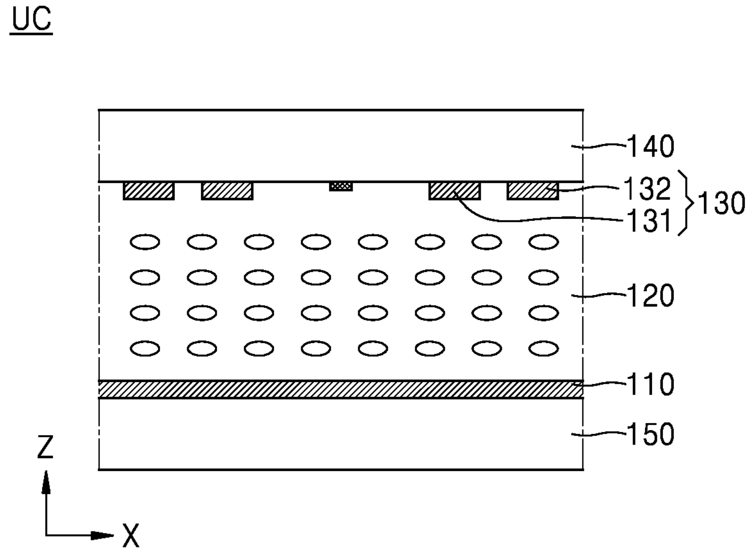
FIG. 2 is a cross-sectional view of a unit cell included in the liquid crystal polarization antenna of FIG. 1.
Figure 3:
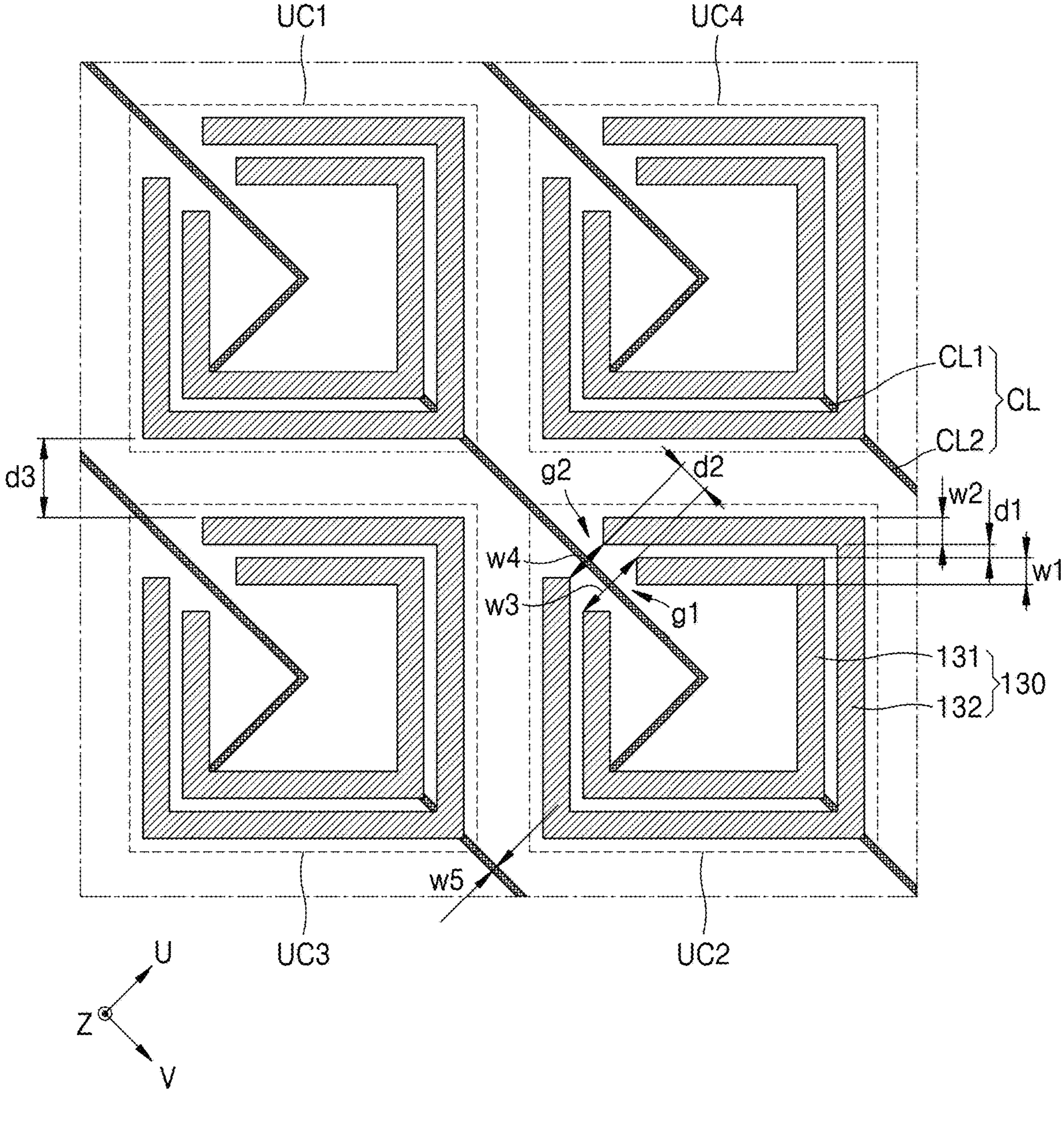
FIG. 3 is an enlarged plan view of a portion of a region included in the liquid crystal polarization antenna of FIG. 1.

FIG. 1 is an exploded view diagram illustrating a liquid crystal polarization antenna 100 according to a first embodiment, FIG. 2 is a cross-sectional view of a unit cell UC included in the liquid crystal polarization antenna 100 of FIG. 1, and FIG. 3 is an enlarged plan view of a portion of the area included in the liquid crystal polarization antenna 100 of FIG. 1.

Referring to FIG. 1, the liquid crystal polarization antenna 100 according to an embodiment may include a plurality of unit cells UC periodically arranged in a first direction (V axis) and a second direction (U axis). The liquid crystal polarization antenna 100 may include a plurality of conductive lines CL configured to electrically connect the unit cells UC arranged in the first direction (V axis) of the plurality of unit cells UC. While FIG. 1 illustrates a 3×4 arrangement of the plurality of unit cells UC, the number of unit cells UC and the arrangement structure are not limited.

Referring to FIG. 1 and FIG. 2, each of the plurality of unit cells UC may include a first electrode 110, a liquid crystal layer 120 disposed on the first electrode 110, a second electrode 130 disposed on the liquid crystal layer 120, and a plurality of conductive rings 131, 132, each with a gap. The liquid crystal polarization antenna 100 may additionally include a first substrate 140 supporting the first electrode 110 and a second substrate 150 disposed on the plurality of second electrodes 130.

The first electrode 110 is plate-shaped and may be formed of a conductive material. For example, the first electrode 110 may be formed of a metal with high electrical conductivity, such as copper.

The first electrodes 110 in a plurality of unit cells UC may be formed as a single layer on the first substrate 140. Or, the first electrodes 110 in a plurality of unit cells UC may be formed as a plurality of layers on the first substrate 140 The first electrodes 110 may be grouped together to form a single layer, and the grouped first electrodes 110 may be spaced apart from each other. Furthermore, the first electrodes 110 in a plurality of unit cells UC may be subjected to the same voltage. For example, the first electrode 110 may be grounded.

Each of the plurality of unit cells UC may include a liquid crystal layer 120 disposed on the first electrode 110. The liquid crystal layer 120 may include a plurality of liquid crystal molecules that undergo orientation change by a voltage applied to the first electrode 110 and the second electrode 130. The plurality of liquid crystal molecules may be initially arranged in one direction of the major axis, for example, in a direction parallel to the surface of the first electrode 110.

The liquid crystal molecules may be, but are not limited to, molecules that has a positive type of dielectric anisotropy. When a voltage is applied to each of the first electrode 110 and the second electrode 130, an electric field (E-field) may be formed in the liquid crystal layer 120 between the first electrode 110 and the second electrode 130. Depending on the strength of the E-field, in other words, the voltage difference between the applied voltages, the liquid crystal molecules may be rotated in an orientation parallel to the E-field.

This phenomenon may be utilized to cause phase modulation of the incident wave through the second substrate 150. By rotating the orientations of the long diameters of the liquid crystal molecules in response to the E-field formed between the first electrode 110 and the second electrode 130, the liquid crystal polarization antenna 100 may form an electrical prism to steer waves in a specific direction. The wave according to an embodiment may be an electromagnetic wave in the radio frequency band. For example, the wave according to an embodiment may be an electromagnetic wave that has a frequency of about 100 GHz or more, or an electromagnetic wave that has a frequency of about 100 GHz or more and about 200 GHz or less.

The liquid crystal layer 120 is relatively inexpensive and may prevent the return loss to the wave from becoming large even at high operating frequencies. In addition, the liquid crystal layer 120 may change its dielectric constant in response to an applied E-field, which may improve the steering characteristics of the beam (or wave).

The liquid crystal layers 120 in a plurality of unit cells UC may be formed as a single layer on the first electrode 110. However, the formation of liquid crystal layers 120 is not limited thereto. However, the liquid crystal layers 120 may be grouped to form a single layer, and the grouped liquid crystal layers 120 may be separated by a spacer etc.

Each of the plurality of unit cells UC is disposed on the liquid crystal layer 120, and each may include a second electrode 130 that includes a plurality of conductive rings 131, 132 with gaps g1, g2. The second electrode 130 may be symmetrically shaped with respect to the first direction (V axis) and asymmetrically shaped with respect to the second direction (U axis). Since the second electrode 130 is asymmetrically shaped with respect to the second direction (U-axis), it may convert the polarization of the incident wave. For example, the liquid crystal polarization antenna 100 may output a polarization of an incident wave by rotating and converting the polarization by +90 degrees or −90 degrees with respect to the direction of travel of the wave.

Since the second electrode 130 according to an embodiment includes a plurality of conductive rings, the resonant frequency range of the incident wave on the unit cell UC may be broadened. Thus, the liquid crystal polarization antenna 100 according to an embodiment may steer waves in a wider frequency band.

Referring to FIG. 3, the second electrode 130 may include a first conductive ring 131 that has a first gap g1 and a second conductive ring 132 surrounding the first conductive ring 131 and has a second gap g2. The first conductive ring 131 and the second conductive ring 132 may be formed of the same conductive material, or they may be formed of different conductive materials. For example, the first conductive ring 131 and the second conductive ring 132 may be formed of a metal with high electrical conductivity, such as copper.

The first conductive ring 131 and the second conductive ring 132 may be spaced apart. The centers of the first conductive ring 131 and the second conductive ring 132 may coincide. The distance d1 between the first conductive ring 131 and the second conductive ring 132 may be at least less than or equal to one width of a width w1 of the first conductive ring 131 and a width w2 of the second conductive ring 132. If the distance d1 between the first conductive ring 131 and the second conductive ring 132 is too large, the first conductive ring 131 and the second conductive ring 132 may operate independently, resulting in a resonant frequency range that is not continuous. When the frequencies of waves resonating in the first conductive ring 131 and the frequencies of waves resonating in the second conductive ring 132 overlap at least partially according to an embodiment, the frequency band of waves that has a return loss below a certain size may be widened.

The first conductive ring 131 may include a first gap g1 and the second conductive ring 132 may include a second gap g2. The first gap g1 and the second gap g2 may be arranged in a first direction (V axis). For example, the first gap g1 and the second gap g2 may be arranged to overlap each other with respect to the first direction (V axis).

The distance d2 between the first gap g1 and the second gap g2 may be less than the width of the internal space of the first conductive ring 131, but greater than or equal to the distance d1 between the first conductive ring 131 and the second conductive ring 132. Through the first gap g1 and the second gap g2, the internal space of the unit cell UC may be connected to the external space of the unit cell UC.

A width w3 of the first gap g1 may be less than the length of the first conductive ring 131, and a width w4 of the second gap g2 may be less than the length of the second conductive ring 132. For example, the width w3 of the first gap g1 may be less than or equal to ¼ of the length of the first conductive ring 131, and the width w4 of the second gap g2 may be less than or equal to ¼ of the length of the second conductive ring 132.

The width w3 of the first gap g1 may be greater than or equal to the width w1 of the first conductive ring 131, and the width w4 of the second gap g2 may be greater than or equal to the width w2 of the second conductive ring 132. At least one of the width w3 of the first gap g1 and the width w4 of the second gap g2 may vary from an internal space of the unit cell UC to an external space of the unit cell UC. For example, at least one of the first gap g1 and the second gap g2 may progressively increase in width w3, w4 from the internal space of the unit cell UC to the external space of the unit cell UC. In other words, the width w3 of the first gap g1 may vary from an inner side of the first conductive ring 131 to an external side of the first conductive ring 131, and the width w4 of the second gap g2 may vary from an inner side of the second conductive ring 132 to an external side of the second conductive ring 132.

The length of the second conductive ring 132 may be greater than or equal to the length of the first conductive ring 131, and may be less than a wavelength of the wave operating in the liquid crystal polarization antenna 100 (hereinafter referred to as an operating wavelength). For example, the length of the second conductive ring 132 may be ½ or less, or ¼ or less, of the wavelength of the incident wave.

The first conductive ring 131 and the second conductive ring 132 may be have the same shape. In the drawings, the first conductive ring 131 and the second conductive ring 132 are illustrated as being partially shaped like a rectangular ring. However, the shape of the conductive rings are not limited thereto. The first conductive ring 131 and the second conductive ring 132 may be partially shaped like any one of a circular ring, an elliptical ring, and a polygonal ring. The first conductive ring 131 and the second conductive ring 132 may have the same shape or may have different shapes. By having different shapes, the first conductive ring 131 and the second conductive ring 132 may widen the resonant frequency range.

The drawings show, but are not limited to, a second electrode 130 that has two conductive rings. The second electrode 130 may include three or more conductive rings.

Referring to FIG. 1 and FIG. 3, the second electrodes 130 included in the unit cell UC may be spaced apart from each other. The distance d3 between the second electrodes 130 may be less than the wavelength of the waves operating in the liquid crystal polarization antenna 100. For example, the distance d3 between the second electrodes 130 may be ½ or less, or ¼ or less, of the operating wavelength.

The liquid crystal polarization antenna 100 may include a plurality of conductive lines CL configured to electrically connect the unit cells UC arranged in a first direction (V axis) of the plurality of unit cells UC. Each of the plurality of conductive lines CL may electrically connect a second electrode 130 arranged in a first direction (V axis) of the unit cells UC.

The width w5 of the conductive lines CL may be small so as not to affect polarization conversion for waves of the operating wavelength. For example, the width w5 of the conductive line CL may be smaller than the widths w1, w2 of the conductive rings 131, 132. Alternatively, the width w5 of the conductive line CL may be ½ or less, ¼ or less, ⅛ or less of the widths w1, w2 of the first and second conductive rings 131, 132. The conductive line CL may be formed of the same material as the second electrode 130, or may be formed of a different material than the second electrode 130.

The conductive lines CL may include a first conductive line CL1 configured to electrically connect conductive rings 131, 132 included in the same unit cell UC and a second conductive line CL2 configured to electrically connect conductive rings 131, 132 included in different unit cells UC. For example, the first conductive line CL1 may connect the first conductive ring 131 and the second conductive ring 132 included in the same unit cell UC, and the second conductive line CL2 may connect the first conductive ring 131 and the second conductive ring 132 included in different unit cells UC.

The conductive lines CL may include a region extending in the first direction (V axis). For example, the first conductive line CL1 may be a straight line extending in the first direction (V axis), tangent to the first conductive line CL1 at one end and tangent to the second conductive line CL2 at the other end. The first conductive ring 131 and the second conductive ring 132 to which the first conductive line CL1 is tangential may be included in the same unit cell UC.

The second conductive line CL2 may be bent one or more times, and may be shaped such that one end is in contact with the first conductive line CL1 and the other end is in contact with the second conductive line CL2. The first conductive ring 131 and the second conductive ring 132 of the second conductive line CL2 may be included in different unit cells UC arranged adjacent to each other. The second conductive line CL2 may pass through the first gap g1 and the second gap g2 included in the same unit cell UC. The region of the second conductive line CL2 that penetrates the first gap g1 and the second gap g2 may extend in the first direction (V axis).

The plurality of unit cells UC may be arranged in the first direction (V axis), and may be arranged in the second direction (U axis). Among the plurality of unit cells UC, adjacent unit cells UC may be arranged to be offset from each other. For example, a plurality of unit cells UC may include a first unit cell UC1 and a second unit cell UC2 spaced apart in a first direction (V axis), and a third unit cell UC3 and a fourth unit cell UC4 spaced apart in a second direction (U axis), where a portion of the third unit cell UC3 may be arranged to overlap with the first unit cell UC1 and the second unit cell UC2 in the first direction (V axis). Adjacent unit cells UC may be arranged to be offset from each other to increase the density of the unit cells UC.

A first substrate 140 and a second substrate 150 may be made of an insulating material. For example, at least one of the first substrate 140 and the second substrate 150 may be formed of glass, plastic, etc. The first substrate 140 and the second substrate 150 may be formed of a silicon oxide, particularly quartz.

Figure 4:
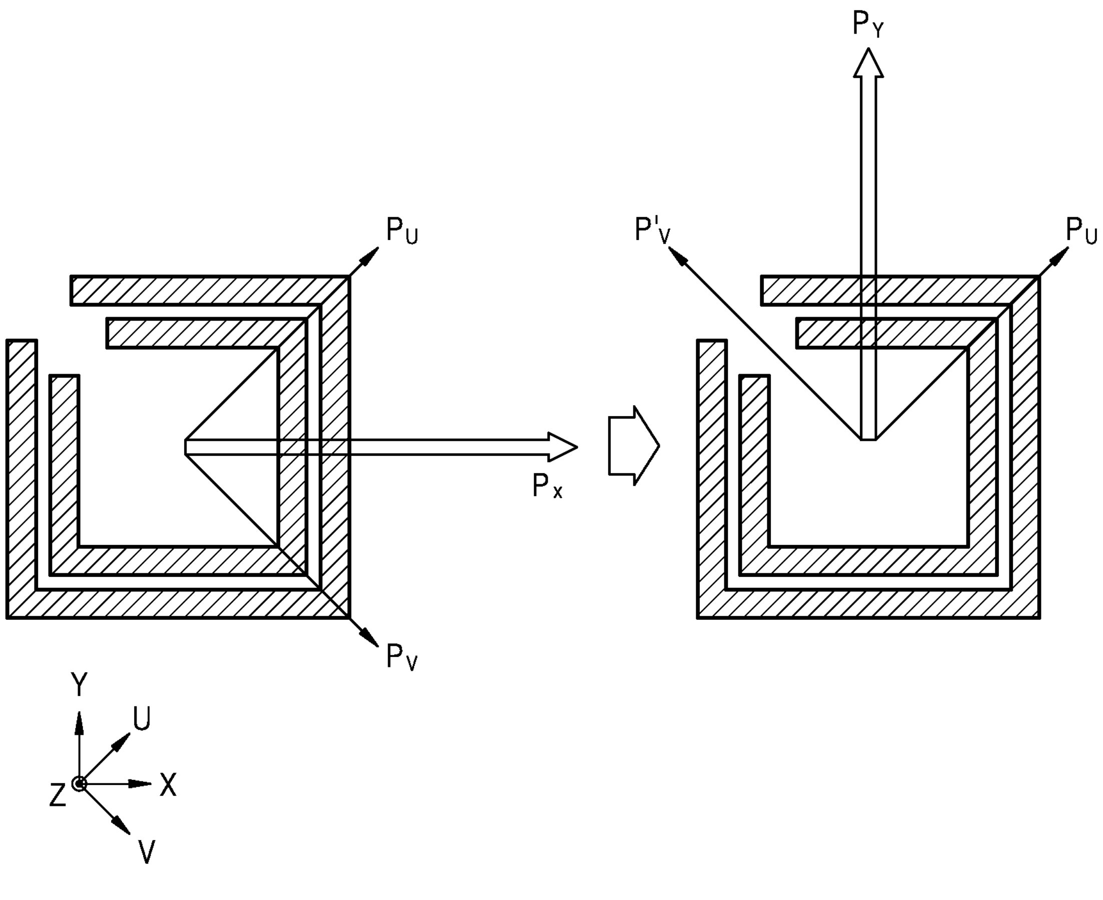
FIG. 4 is a reference diagram illustrating a method of converting a polarization of a wave by a second electrode according to an embodiment.

FIG. 4 is a reference diagram illustrating a method of converting the polarization of a wave by a second electrode 130 according to an embodiment.

Referring to FIG. 4, a wave with any polarization may be incident on the second electrode 130. For example, the incident wave may have an X-axis polarization Px. The incident wave may have a component Pv in the first direction (V axis) and a component Pu in the second direction (U axis).

On the other hand, since the second electrode 130 is asymmetrically shaped with respect to the second direction (U axis) by the first gap g1 and the second gap g2, the component Pv in the first direction (V axis) of the wave may be rotated 180 degrees as the incident wave resonates in the liquid crystal polarization antenna 100. The synthesized wave Py of the rotated first direction (V' axis) component P'v and the second direction (U axis) component Pu may have a Y-axis polarization. The wave with the Y-axis polarization may be reflected from the liquid crystal polarization antenna 100.

The liquid crystal layer 120 according to an embodiment may change the dielectric constant of the liquid crystal layer 120 by rearranging the liquid crystal molecules in response to an applied voltage. The dielectric constant of the liquid crystal layer 120 according to an embodiment may vary depending on the longitudinal direction of the liquid crystal molecules. For example, the dielectric constant of the liquid crystal layer 120 may be smallest when the longitudinal direction of the liquid crystal molecules is arranged with the surface of the first electrode 110. And, when the longitudinal direction of the liquid crystal molecules is arranged perpendicular to the surface of the first electrode 110, the dielectric constant of the liquid crystal layer 120 may be the largest. The above arrangement of the liquid crystal molecules may be adjusted by a voltage applied to the first electrode 110 and the second electrode 130. The dielectric constant of the liquid crystal layer 120 according to an embodiment may vary from about 2 or more to about 4 or less, or from about 2 or more to about 3.5 or less.

Figure 5:
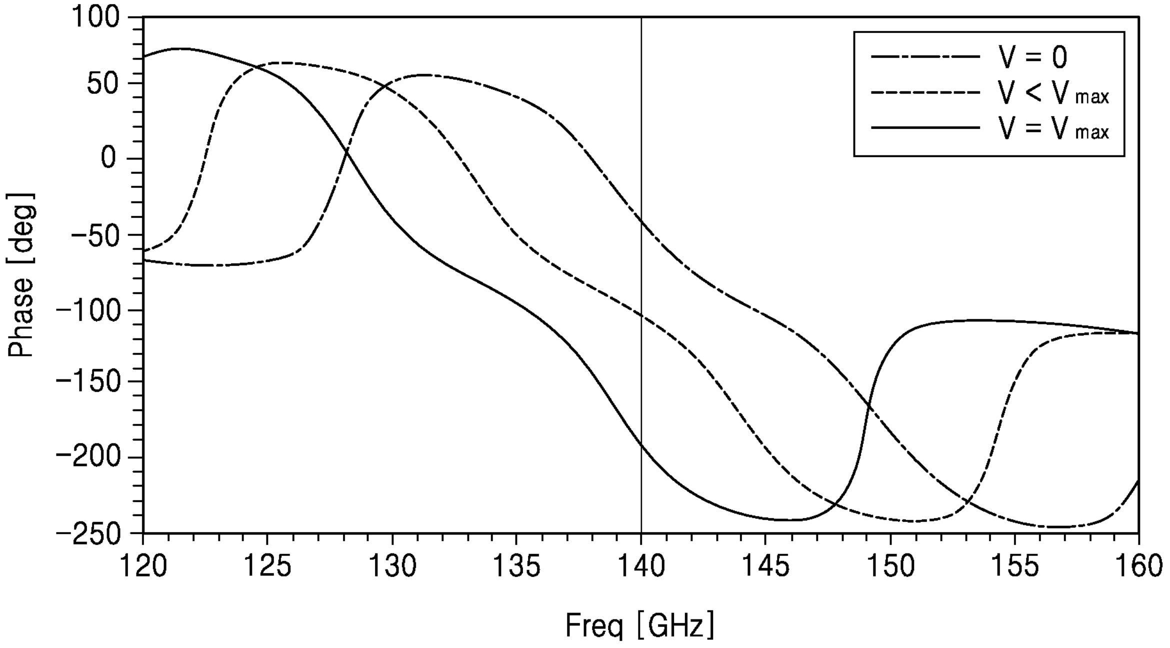
FIG. 5 is a result illustrating a phase shift with operating frequency of a unit cell included in a liquid crystal polarization antenna according to an embodiment.

FIG. 5 is a result illustrating a phase shift with operating frequency of a unit cell UC included in the liquid crystal polarization antenna 100 according to an embodiment. Referring to FIG. 5, it may be confirmed that when the liquid crystal molecules of the liquid crystal layer 120 are arranged in a direction parallel to the surface of the first electrode 110, that is, when no voltage is applied to the unit cell UC, a phase shift of about −38 degrees occurs when a wave of about 140 GHz is incident.

In addition, it may be confirmed that when the liquid crystal molecules of the liquid crystal layer 120 are arranged in a direction perpendicular to the surface of the first electrode 110, that is, when the maximum voltage is applied to the unit cell UC, a phase shift of about −138.25 degrees occurs when a wave of about 140 GHz is applied.

Furthermore, it may be confirmed that when the liquid crystal molecules of the liquid crystal layer 120 are arranged in a direction inclined to the surface of the first electrode 110, that is, when a voltage below the maximum voltage is applied to the unit cell UC, a wave with a phase shift of about −100.70 degrees is output when a wave of about 140 GHz is applied.

Therefore, it may be confirmed that the liquid crystal polarization antenna 100 according to an embodiment is capable of varying the phase within a range of about 160 degrees for a wave that has an operating frequency of about 140 GHz.

The liquid crystal polarization antenna 100 according to an embodiment may not only convert the polarization of the incident wave, but also steer the wave over a wide angle. The frequency bandwidth of a wave with a variable phase range of about 100 degrees or more may be about 10 GHz. For example, the wave may have a variable phase range of about 100 degrees or more for a wave that has an operating frequency in a range of about 133 GHz to 145 GHz.

Figure 6:
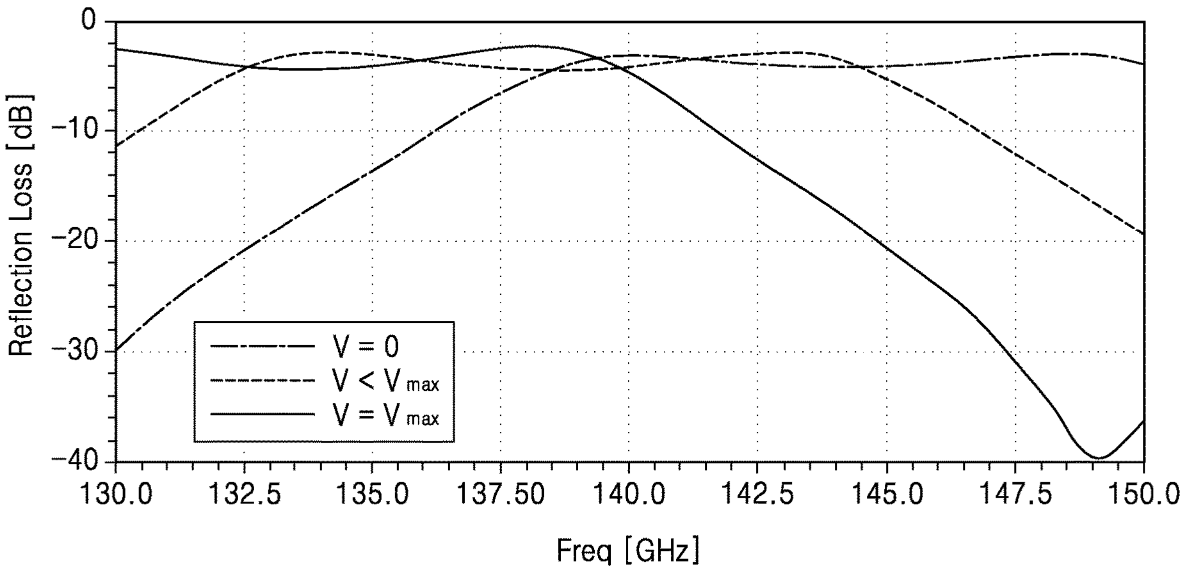
FIG. 6 is a graph illustrating return loss as a function of operating frequency of a unit cell according to an embodiment.

FIG. 6 is a graph illustrating return loss as a function of operating frequency of a unit cell UC according to an embodiment. Referring to FIG. 6, it may be confirmed that when the liquid crystal molecules of the liquid crystal layer 120 are arranged in a direction parallel to the surface of the first electrode 110, that is, when no voltage is applied to the unit cell UC, the return loss for a wave of about 140 GHz is about −3.11 dB.

In addition, it may be confirmed that when the liquid crystal molecules of the liquid crystal layer 120 are arranged in a direction perpendicular to the surface of the first electrode 110, that is, when the maximum voltage is applied to the unit cell UC, the return loss for a wave with an operating frequency of about 140 GHz is about −4.76 dB.

Furthermore, it may be confirmed that when the liquid crystal molecules of the liquid crystal layer 120 are arranged in a direction inclined to the surface of the first electrode 110, that is, when a voltage below the maximum voltage is applied to the unit cell UC, the return loss for a wave of about 140 GHz is about −4.07 dB.

Therefore, it may be confirmed that the liquid crystal polarization antenna 100 according to an embodiment has an absolute value of return loss of 10 dB or less for waves that has an operating frequency of about 136 GHz to about 142 GHz. Since the second electrode 130 included in each of the unit cells (UC) includes a plurality of conductive rings that has a gap, it may be confirmed that the range of resonant wavelengths of the waves is widened.

Figure 7:
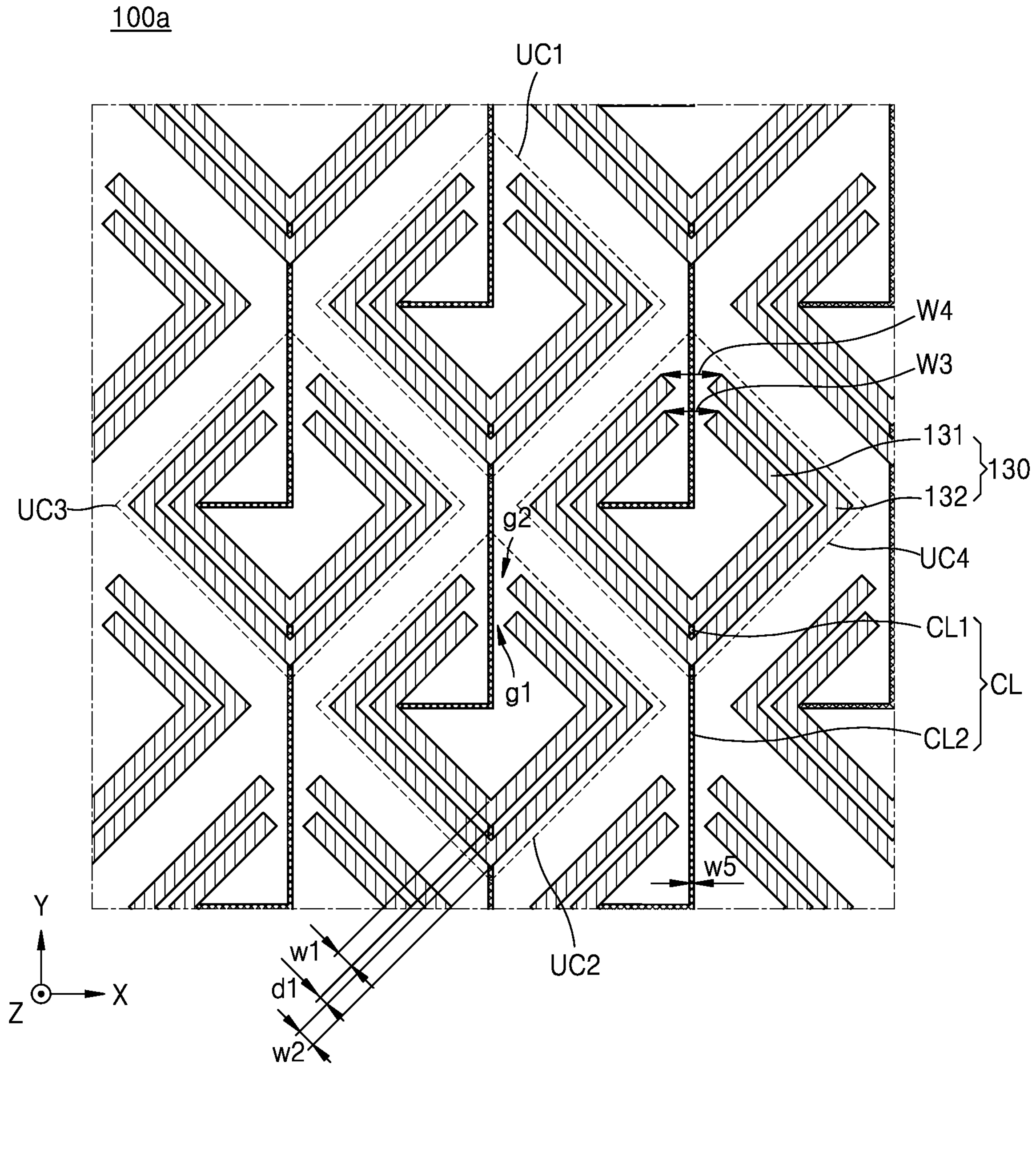
FIG. 7 is a diagram illustrating a portion of a liquid crystal polarization antenna according to a second embodiment.

FIG. 7 is a diagram illustrating a portion of a liquid crystal polarization antenna 100*a*, according to a second embodiment. For simplicity of description, substantially the same features as described in FIG. 1 to FIG. 3 may not be described.

Comparing FIG. 1 and FIG. 7, the liquid crystal polarization antenna 100*a* of FIG. 7 may include a plurality of unit cells UC periodically arranged in the X-axis direction and the Y-axis direction. The liquid crystal polarization antenna 100*a* may include a plurality of conductive lines CL configured to electrically connect the unit cells UC arranged in the Y-axis direction among the plurality of unit cells UC.

Each of the plurality of unit cells UC may include a first electrode (same as the first electrode 110 of FIG. 1), a liquid crystal layer disposed on the first electrode (same as the liquid crystal layer 120 of FIG. 1), and a second electrode 130 disposed on the liquid crystal layer and including a plurality of conductive rings, each with a gap. The first electrode and liquid crystal layer are substantially the same as those described in FIG. 1 to FIG. 3, and specific descriptions will be omitted.

The second electrode 130 may have a shape that is symmetrical with respect to the Y-axis direction and asymmetrical with respect to the X-axis direction. Since the second electrode 130 has a shape that is asymmetrical with respect to the X-axis direction, it may convert the polarization of an incident wave. For example, the liquid crystal polarization antenna 100 may output a polarization of an incident wave by rotating and converting the polarization by +90 degrees or −90 degrees with respect to the direction of travel of the wave (Z-axis).

Since the second electrode 130 includes a plurality of conductive rings, the resonant frequency range of the incident wave on the unit cell UC may be broadened. Thus, the liquid crystal polarization antenna 100*a* according to an embodiment may steer waves in a wider frequency band.

The second electrode 130 may include a first conductive ring 131 that has a first gap g1 and a second conductive ring 132 surrounding the first conductive ring 131 and has a second gap g2.

The first conductive ring 131 and the second conductive ring 132 may be spaced apart. The distance d1 between the first conductive ring 131 and the second conductive ring 132 may be less than or equal to a width w1, w2 of at least one of the first conductive ring 131 and the second conductive ring 132.

The first conductive ring 131 may include a first gap g1 and the second conductive ring 132 may include a second gap G2. The first gap g1 and the second gap g2 may be arranged in the Y-axis direction. For example, the first gap g1 and the second gap g2 may be arranged to overlap each other with respect to the Y-axis direction. The distance d2 between the first gap g1 and the second gap g2 may be less than the width of the internal space of the unit cell UC, but greater than or equal to the distance d1 between the first conductive ring 131 and the second conductive ring 132.

Through the first gap g1 and the second gap g2, the internal space of the unit cell UC may be connected to the external space of the unit cell UC.

A width w3 of the first gap g1 may be less than the length of the first conductive ring 131, and a width w4 of the second gap g2 may be less than the length of the second conductive ring 132. For example, the width w3 of the first gap g1 may be less than or equal to ¼ of the length of the first conductive ring 131, and the width w4 of the second gap g2 may be less than or equal to ¼ of the length of the second conductive ring 132.

The width w3 of the first gap g1 may be greater than or equal to the width w1 of the first conductive ring 131, and the width w4 of the second gap g2 may be greater than or equal to the width w2 of the second conductive ring 132. At least one of the width w3 of the first gap g1 and the width w4 of the second gap g2 may vary from an internal space of the unit cell UC to an external space of the unit cell UC. For example, at least one of the first gap g1 and the second gap g2 may progressively increase in width w3, w4 from the internal space of the unit cell UC to the external space of the unit cell UC.

The length of the second conductive ring 132 may be greater than or equal to the length of the first conductive ring 131, and may be less than a wavelength of the wave operating in the liquid crystal polarization antenna 100*a* (hereinafter referred to as an operating wavelength). For example, the length of the second conductive ring 132 may be ½ or less, or ¼ or less, of the wavelength of the incident wave.

The first conductive ring 131 and the second conductive ring 132 may be have the same shape. For example, the first conductive ring 131 and the second conductive ring 132 may be part of a rhombus ring.

The second electrodes 130 included in the unit cell UC may be spaced apart from each other. The distance d1 between the second electrodes 130 may be less than the wavelength of the waves operating in the liquid crystal polarization antenna 100*a*. For example, the distance d1 between the second electrodes 130 may be ½ or less, or ¼ or less, of the operating wavelength.

The liquid crystal polarization antenna 100*a* may include a plurality of conductive lines CL configured to electrically connect the unit cells UC arranged in the Y-axis direction among the plurality of unit cells UC.

The width w5 of the conductive lines CL may be small so as not to affect polarization conversion for waves of the operating wavelength. For example, the width w5 of the conductive line CL may be smaller than the widths w1, w2 of the conductive rings. Alternatively, the width w5 of the conductive line CL may be ½ or less or ¼ or less of the widths w1, w3 of the first and second conductive rings 131, 132. The conductive line CL may be formed of the same material as the second electrode 130, or may be formed of a different material than the second electrode 130.

The conductive lines CL may include a first conductive line CL1 configured to electrically connect conductive rings included in the same unit cell UC and a second conductive line CL2 configured to electrically connect conductive rings included in different unit cells UC.

The conductive lines CL may include a region extending in the Y-axis direction. For example, the first conductive line CL1 may be a straight line extending in the Y-axis direction, tangent to the first conductive line CL1 at one end and tangent to the second conductive line CL2 at the other end. The second conductive line CL2 may be bent one or more times, and may be shaped in a straight line with one end is in contact with the first conductive line CL1 and the other end is in contact with the second conductive line CL2. The region of the second conductive line CL2 passing through the first gap g1 and the second gap g2 may extend in the Y direction.

In a plurality of unit cells UC, adjacent unit cells UC may be arranged to be offset from each other. For example, the plurality of unit cells UC may include a first unit cell UC and a second unit cell UC spaced apart in the Y-axis direction, and a third unit cell UC and a fourth unit cell UC spaced apart in the X-axis direction, with a portion of the third unit cell UC arranged to overlap in the first unit cell UC and the second unit cell UC in the Y-axis direction. Adjacent unit cells UC may be arranged to be offset from each other to increase the density of the unit cells UC.

Figure 8:
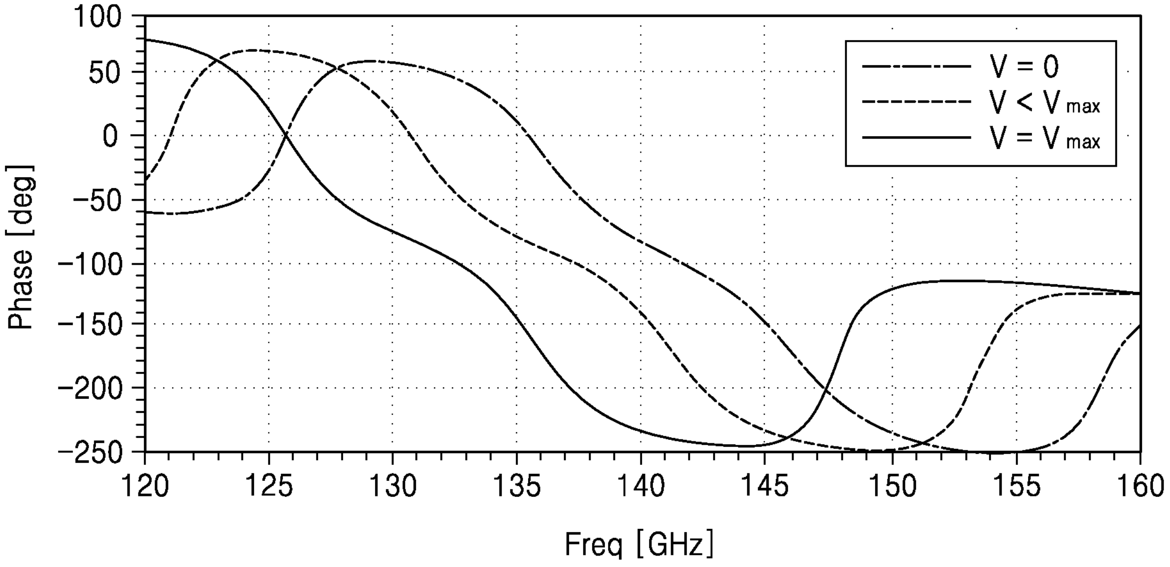
FIG. 8 is a result illustrating a phase shift with operating frequency of a unit cell included in a liquid crystal polarization antenna according to a second embodiment.

FIG. 8 is a result illustrating a phase shift as a function of the operating frequency of the unit cells UC included in the liquid crystal polarization antenna 100*a* according to a second embodiment. Referring to FIG. 8, it may be confirmed that when the liquid crystal molecules of the liquid crystal layer 120 are arranged in a direction parallel to the surface of the first electrode 110, that is, when no voltage is applied to the unit cell UC, a phase shift of about −80 degrees occurs when a wave of about 140 GHz is incident.

In addition, when the liquid crystal molecules of the liquid crystal layer 120 are arranged in a direction perpendicular to the surface of the first electrode 110, that is, when the maximum voltage is applied to the unit cell UC, a phase shift of about −240 degrees occurs when a wave of about 140 GHz is applied.

Furthermore, it may be confirmed that when the liquid crystal molecules of the liquid crystal layer 120 are arranged in a direction inclined to the surface of the first electrode 110, that is, when a voltage below the maximum voltage is applied to the unit cell UC, a wave with a phase shift of about −140 degrees is output when a wave of about 140 GHz is applied.

It may be confirmed that the liquid crystal polarization antenna 100*a* according to an embodiment is capable of varying the phase within a range of about 160 degrees for a wave that has an operating frequency of about 140 GHz.

The liquid crystal polarization antenna 100*a* according to an embodiment may not only convert the polarization of the incident wave, but also steer the wave over a wide angle. The frequency bandwidth of a wave with a variable phase range of about 100 degrees or more may be about 10 GHz or more. For example, the wave may have a variable phase range of about 100 degrees or more for a wave that has an operating frequency in a range of about 130 GHz to 143 GHz.

Figure 9:
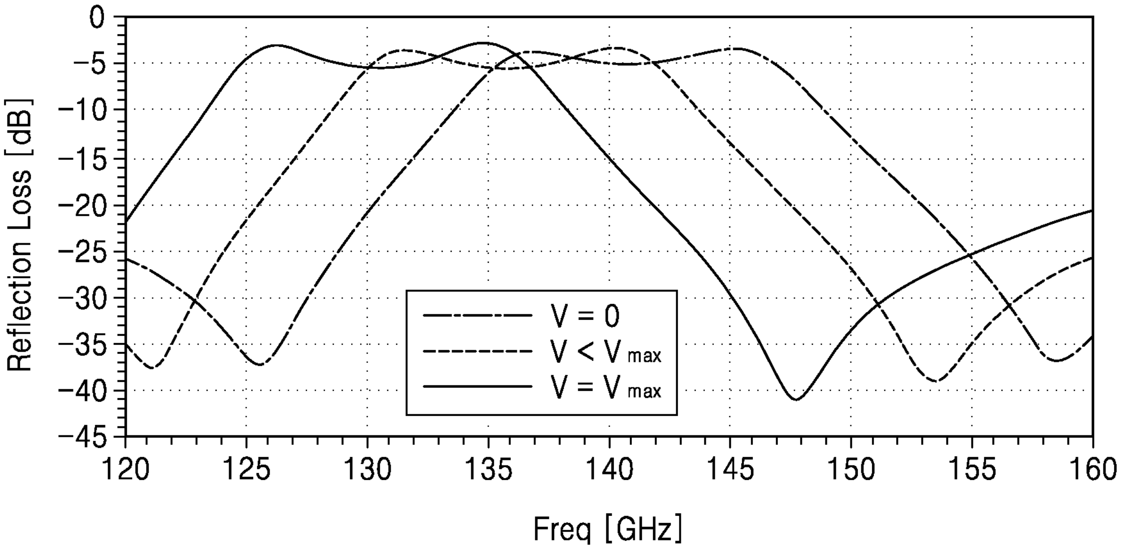
FIG. 9 is a graph illustrating return loss as a function of operating frequency of a unit cell according to a second embodiment.

FIG. 9 is a graph illustrating return loss as a function of operating frequency of a unit cell UC according to a second embodiment. Referring to FIG. 9, it may be confirmed that when the liquid crystal molecules of the liquid crystal layer 120 are arranged in a direction parallel to the surface of the first electrode 110, that is, when no voltage is applied to the unit cell UC, the return loss for a wave of about 140 GHz is about −5 dB.

In addition, it may be confirmed that when the liquid crystal molecules of the liquid crystal layer 120 are arranged in a direction perpendicular to the surface of the first electrode 110, that is, when the maximum voltage is applied to the unit cell UC, the return loss for a wave with an operating frequency of about 140 GHz is about −3 dB.

Furthermore, it may be confirmed that when the liquid crystal molecules of the liquid crystal layer 120 are arranged in a direction inclined to the surface of the first electrode 110, that is, when a voltage below the maximum voltage is applied to the unit cell UC, the return loss for a wave of about 140 GHz is about −15 dB.

Therefore, it may be confirmed that the liquid crystal polarization antenna 100 according to an embodiment has an absolute value of return loss of about −15 dB or less for waves that has an operating frequency of about 132 GHz to about 140 GHz.

Figure 10:
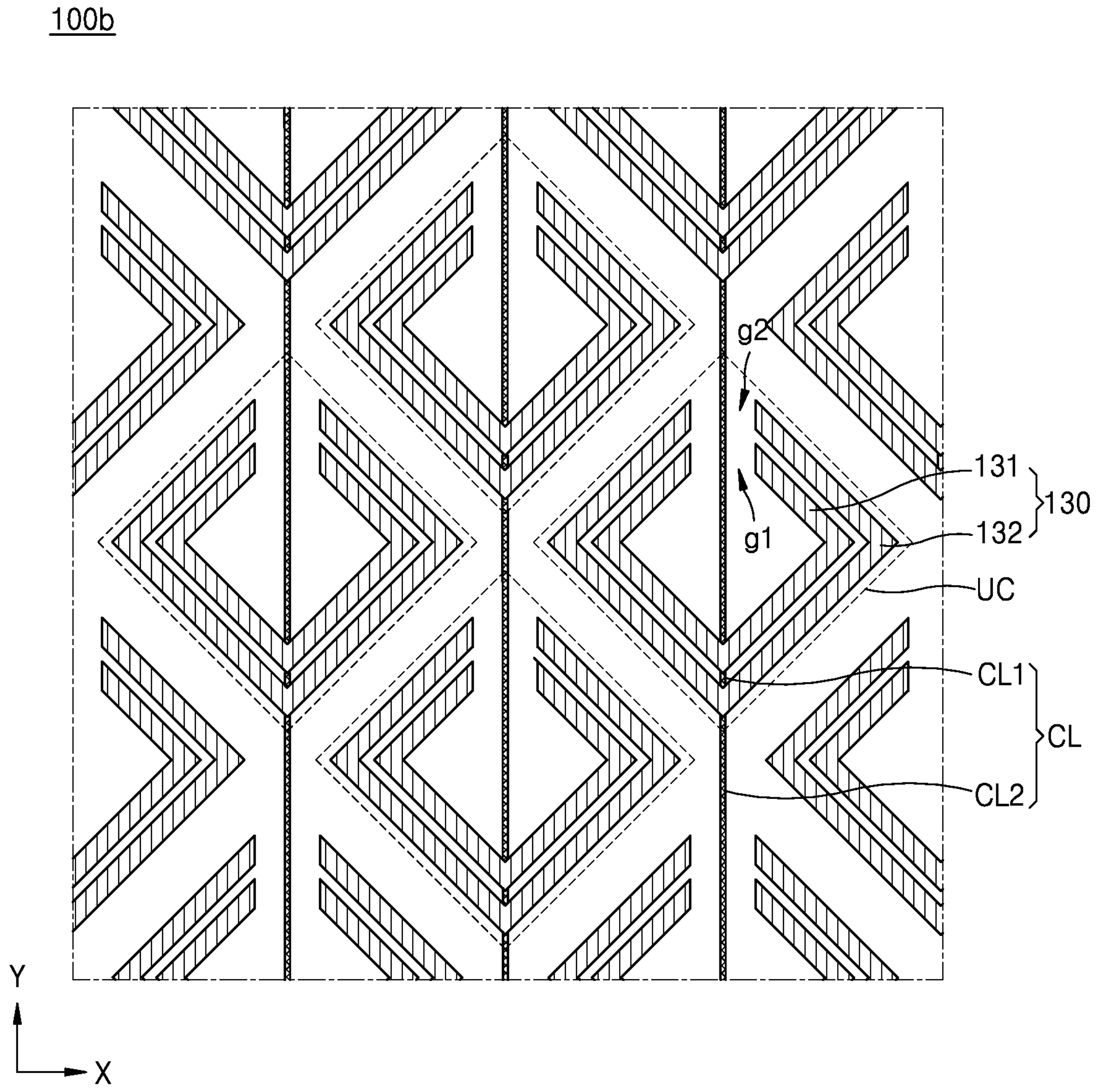
FIG. 10 is a diagram illustrating a portion of a liquid crystal polarization antenna according to a third embodiment.

FIG. 10 is a diagram illustrating a portion of the liquid crystal polarization antenna 100*b* according to a third embodiment. Comparing FIG. 7 and FIG. 10, FIG. 10 shows that the second electrode 130 of the liquid crystal polarization antenna 100*b* may be symmetrical with respect to the Y-axis direction and asymmetrical with respect to the X-axis direction. Since the second electrode 130 has an asymmetrical shape with respect to the X-axis direction, it may convert the polarization of the incident wave. For example, the liquid crystal polarization antenna 100 may output a polarization of an incident wave by rotating and converting the polarization by +90 degrees or −90 degrees with respect to the direction of travel of the wave.

Each of the second electrodes 130 may include a plurality of conductive rings that has a gap. For example, the second electrode 130 may include a first conductive ring 131 that has a first gap g1 and a second conductive ring 132 that has a second gap g2 surrounding the first conductive ring 131. The first conductive ring 131, the second conductive ring 132, the first gap g1 and the second gap g2 have been described previously, and further description will be omitted.

The liquid crystal polarization antenna 100*b* may include a plurality of conductive lines CL configured to electrically connect the unit cells UC arranged in the Y-axis direction among the plurality of unit cells UC.

The conductive lines CL may include a first conductive line CL1 configured to electrically connect conductive rings included in the same unit cell UC and a second conductive line CL2 configured to electrically connect conductive rings included in different unit cells UC. The first conductive line CL1 and the second conductive line CL2 may be straight and integral. Since the first conductive line CL1 and the second conductive line CL2 are integrally shaped as a straight line, fabrication by be easy.

Figure 11:
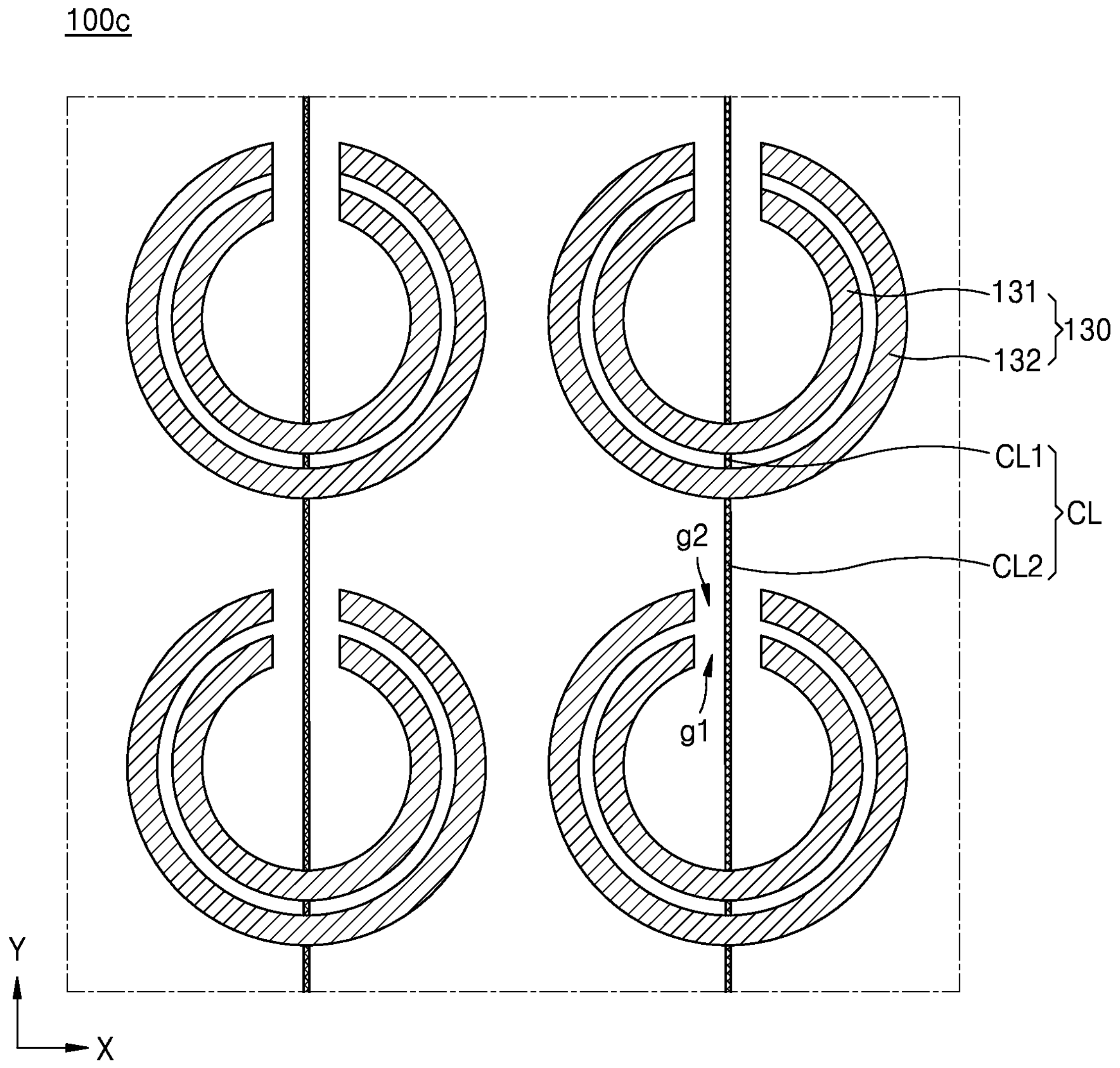
FIG. 11 is a diagram illustrating a portion of a liquid crystal polarization antenna according to a fourth embodiment.

FIG. 11 is a diagram illustrating a portion of the liquid crystal polarization antenna 100*c* according to a fourth embodiment. Comparing FIG. 10 and FIG. 11, each of the second electrodes 130 of the liquid crystal polarization antenna 100 shown in FIG. 11 may include a plurality of conductive rings with gaps. The plurality of conductive rings may be part of a circular ring.

Figure 12:
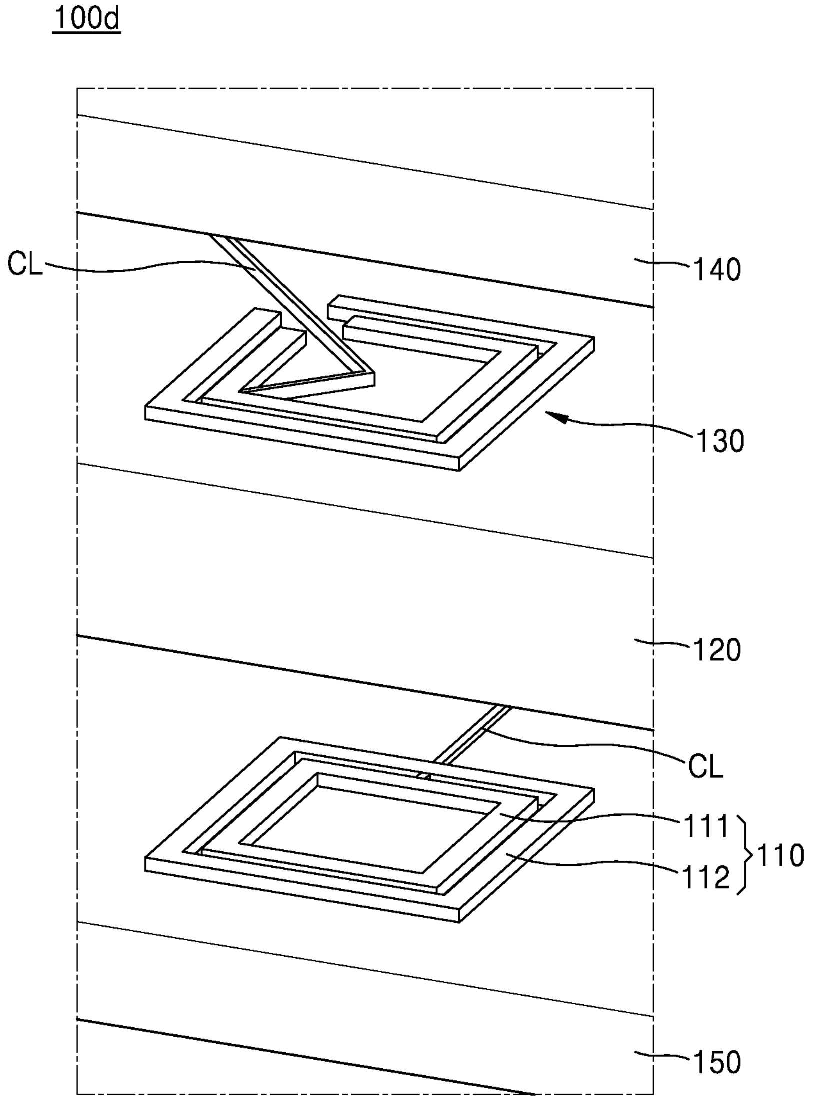
FIG. 12 is a diagram illustrating a portion of a liquid crystal polarization antenna according to a fifth embodiment.

FIG. 12 is a diagram illustrating a portion of a liquid crystal polarization antenna 100*d*, according to a fifth embodiment. Comparing FIG. 1 and FIG. 12, the first electrode 110 of the liquid crystal polarization antenna shown in FIG. 12 may also include a plurality of conductive rings 111, 112. The liquid crystal polarization antenna 100*d* may further include a conductive line CL connecting the plurality of conductive rings 111, 112 included in the liquid crystal first electrode 110. Since the first electrode 110 is also composed of the conductive rings 111 and 112, a resonant frequency band can be widened.

Figure 13:
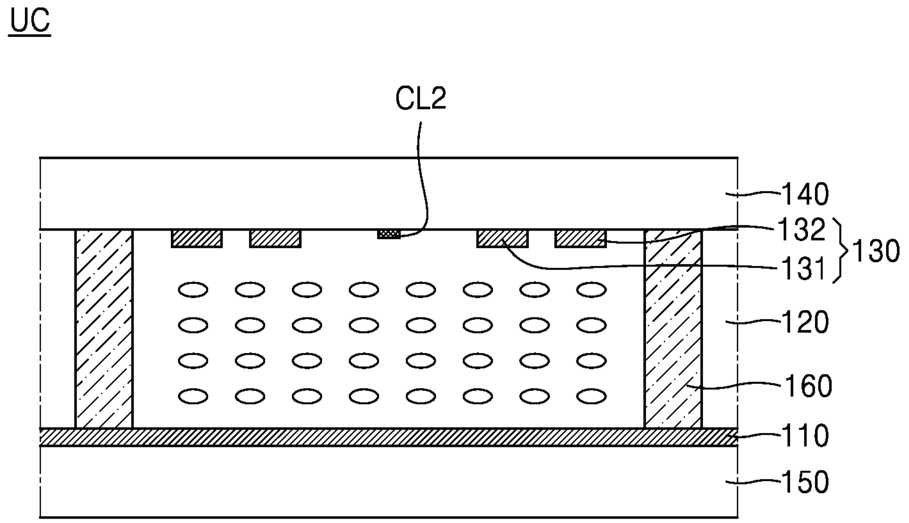
FIG. 13 is a cross-sectional view of a unit cell included in a liquid crystal polarization antenna according to a sixth embodiment.

FIG. 13 is a cross-sectional view of a unit cell included in a liquid crystal polarization antenna according to a sixth embodiment. Comparing FIG. 2 and FIG. 13, the unit cell illustrated in FIG. 13 may further include a spacer 160 between the first substrate 140 and the second substrate 150. The spacer 160 may maintain a constant distance between the first electrode 110 and the second electrode 130. A large area liquid crystal polarization antenna can be easily fabricated by the spacer 160.

The foregoing is merely an exemplary description of a liquid crystal polarization antenna, and one of ordinary skill in the art will understand that various modifications and equally valid other embodiments are possible. While many details have been specified in the foregoing description, they are to be construed as illustrative of specific embodiments rather than as limiting the scope of the invention. The scope may not be limited by the embodiments described, but rather by the technical ideas described in the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A liquid crystal polarization antenna, comprising: a plurality of unit cells arranged two-dimensionally in a first direction and a second direction perpendicular to the first direction; and a conductive line configured to electrically connect to each other the plurality of unit cells arranged in the first direction of the plurality of unit cells, each of unit cells comprising, a first electrode; a liquid crystal layer disposed on the first electrode; and a second electrode disposed on the liquid crystal layer and comprising a first conductive ring that has a first gap and a second conductive ring that has a second gap, wherein the conductive line comprises a first conductive line configured to electrically connect the first conductive ring to the second conductive ring in a same unit cell of the plurality of unit cells and a second conductive line configured to electrically connect the first conductive ring to the second conductive ring in different unit cells of the plurality of unit cells, and the second electrode is symmetrically shaped with respect to the first direction and asymmetrically shaped with respect to the second direction to rotate a component of an incident wave that is parallel to the first direction by 180 degrees.

2. The liquid crystal polarization antenna of claim 1, wherein, the second conductive ring, surrounds the first conductive ring and is spaced apart from the first conductive ring.

3. The liquid crystal polarization antenna of claim 2, wherein, a distance between the first conductive ring and the second conductive ring is less than or equal to a width of at least one of the first conductive ring and the second conductive ring.

4. The liquid crystal polarization antenna of claim 1, wherein the first gap and the second gap are in the first direction.

5. The liquid crystal polarization antenna of claim 1, wherein at least a portion of the first gap overlaps the second gap in the first direction.

6. The liquid crystal polarization antenna of claim 1, wherein a width of the first gap is less than 1/4 of a length of the first conductive ring.

7. The liquid crystal polarization antenna of claim 1, wherein a distance between the first gap and the second gap is greater than or equal to a distance between the first conductive ring and the second conductive ring.

8. The liquid crystal polarization antenna of claim 1, wherein a width of the first gap, is greater than or equal to a width of the first conductive ring.

9. The liquid crystal polarization antenna of claim 1, wherein a width of the first gap varies from an inner side of the first conductive ring to an external side of the first conductive ring.

10. The liquid crystal polarization antenna of claim 1, wherein the first conductive ring is part of any one of a circular ring, an elliptical ring, and a polygonal ring.

11. The liquid crystal polarization antenna of claim 1, wherein, a width of the conductive line is less than a width of the first conductive ring and a width of the second conductive ring.

12. The liquid crystal polarization antenna of claim 1, wherein, the first conductive line extends in the first direction.

13. The liquid crystal polarization antenna of claim 1, wherein, the second conductive line passes through the first gap and the second gap.

14. The liquid crystal polarization antenna of claim 1, the plurality of unit cells comprising:

a first unit cell and a second unit cell spaced apart in the first direction, and a third unit cell and a fourth unit cell spaced apart in the second direction, wherein a portion of the third unit cell overlaps the first unit cell and the second unit cell in the first direction.

15. The liquid crystal polarization antenna of claim 1, wherein the liquid crystal polarization antenna rotationally converts a polarization of the incident wave by about +90 degrees or about −90 degrees with respect to a direction of travel of the incident wave.

16. The liquid crystal polarization antenna of claim 1, wherein the liquid crystal polarization antenna steers waves with an absolute value of return loss of about 10 dB or less over a frequency bandwidth of about 5 GHz or more.

17. The liquid crystal polarization antenna of claim 1, wherein the liquid crystal polarization antenna has a variable phase range of greater than or equal to about 100 degrees.

* * * * *